United States Patent
Tanaka

(10) Patent No.: US 7,851,101 B2
(45) Date of Patent: Dec. 14, 2010

(54) FUEL CELL STACK, INSTALLATION STRUCTURE OF FUEL CELL STACK, METHOD OF TRANSPORTING FUEL CELL STACK, AND METHOD OF MOUNTING FUEL CELL STACK ON VEHICLE

(75) Inventor: Hideyuki Tanaka, Kariya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 397 days.

(21) Appl. No.: 11/883,135

(22) PCT Filed: Feb. 2, 2006

(86) PCT No.: PCT/JP2006/302218

§ 371 (c)(1),
(2), (4) Date: Jul. 26, 2007

(87) PCT Pub. No.: WO2006/083018

PCT Pub. Date: Aug. 10, 2006

(65) Prior Publication Data

US 2008/0166600 A1    Jul. 10, 2008

(30) Foreign Application Priority Data

Feb. 2, 2005   (JP)   ............................. 2005-026930

(51) Int. Cl.
*H01M 2/20*   (2006.01)

(52) U.S. Cl. ................ 429/469; 429/452; 429/467; 429/471

(58) Field of Classification Search ............. None
See application file for complete search history.

(56) References Cited

U.S. PATENT DOCUMENTS

| | | | |
|---|---|---|---|
| 6,479,180 B1 * | 11/2002 | Uozumi | 429/34 |
| 6,613,470 B1 * | 9/2003 | Sugita et al. | 429/38 |
| 6,855,448 B2 * | 2/2005 | Kikuchi et al. | 429/34 |
| 2002/0142209 A1 * | 10/2002 | Kikuchi et al. | 429/34 |
| 2004/0209140 A1 | 10/2004 | Okazaki et al. | |
| 2004/1024503 | 12/2004 | Reid et al. | |
| 2007/0199746 A1 * | 8/2007 | Reid et al. | 180/65.3 |

FOREIGN PATENT DOCUMENTS

| | | |
|---|---|---|
| DE | 100 41 532 A1 | 3/2001 |
| DE | 100 33 989 A1 | 5/2002 |

(Continued)

OTHER PUBLICATIONS

Official Translation of JP 61-147472.*

*Primary Examiner*—Patrick Ryan
*Assistant Examiner*—Cynthia Lee
(74) *Attorney, Agent, or Firm*—Kenyon & Kenyon LLP

(57) ABSTRACT

In order to easily transport a fuel cell stack, without increasing costs, the fuel cell stack according to the present invention includes a stack body 5 in which end plates 8, 8 are arranged at both ends in a cell lamination direction, and suspension hangers 10 provided on the end plates 8, 8. The suspension hangers 10 project outward from a case 6 in which the stack body 5 is stored. With this arrangement, the fuel cell stack can be suspended from outside the case 6, and transported. Also using the suspension hangers 10, this fuel cell stack can be secured in a predetermined installation location.

12 Claims, 9 Drawing Sheets

FOREIGN PATENT DOCUMENTS

| | | |
|---|---|---|
| DE | 102 13 558 A1 | 11/2002 |
| JP | 61-147472 * | 7/1986 |
| JP | 61-147472 A | 7/1986 |
| JP | 62-115674 A | 5/1987 |
| JP | 4-31264 U | 3/1992 |
| JP | 06-231795 A | 8/1994 |
| JP | 09-161830 A | 6/1997 |
| JP | 2003-346872 A | 12/2003 |
| JP | 2004-288499 A | 10/2004 |
| JP | 2004-327089 A | 11/2004 |
| JP | 2005-276484 A | 10/2005 |

* cited by examiner

FUEL CELL STACK, INSTALLATION STRUCTURE OF FUEL CELL STACK, METHOD OF TRANSPORTING FUEL CELL STACK, AND METHOD OF MOUNTING FUEL CELL STACK ON VEHICLE

This is a 371 national phase application of PCT/JP2006/302218 filed 02 Feb. 2006, claiming priority to Japanese Patent Application No. 2005-026930 filed 02 Feb. 2005, the contents of which are incorporated herein by reference.

TECHNICAL FIELD

The present invention relates to a fuel cell stack, an installation structure of a fuel cell stack, a method for transporting a fuel cell stack and a method for mounting a fuel cell stack in a vehicle, and relates particularly to a technique for simplifying the transportation of the fuel cell stack without increasing costs.

BACKGROUND ART

A fuel cell stack of a solid polymer electrolyte type, for example, is provided by laminating modules, each of which is obtained by one or more cells superposed one on another, with each cell including a membrane-electrode assembly (MEA) and a separator. The MEA includes an electrolytic membrane that is provided by an ion exchange membrane, an electrode (an anode) formed of a catalytic layer and arranged on one surface of the electrolytic membrane, and an electrode (a cathode) formed of a catalytic layer and arranged on the other surface of the electrolytic membrane. This fuel cell stack is used by being accommodated in a fuel cell case (see, for example, JP H06-231795 A).

DISCLOSURE OF THE INVENTION

However, in a case wherein the fuel cell case is formed of steel plate, aluminum or the like, transportation of the fuel cell stack is difficult. For transportation, as shown in FIG. 14, a special transportation tool 1 having a satisfactory strength must be additionally prepared, and a fuel cell case 2 in which a fuel cell stack 3 is accommodated needs to be mounted on the transportation tool 1.

Here, it can be conceived that suspension hangers can be attached to the fuel cell case to facilitate the suspension of the fuel cell case. However, in this case, as the fuel cell stack is heavy, it is necessary for the suspension hangers to have the strength sufficient to bear the suspension of the fuel cell case while being transported. Also, a problem is that when the case strength is increased, merely for transportation, the strength exceeds that required in use, and costs are increased.

The present invention is provided while taking the above described situation into account, and one objective of the invention is to provide a fuel cell stack that can be easily transported without increasing costs, an installation structure for the fuel cell stack, a transportation method for the fuel cell stack, and a method for mounting the fuel cell stack in a vehicle.

In order to solve the above problem, a fuel cell stack, according to the present invention, has a stack body including a pile of fuel cells as a part of stack structural members. Any of the stack structural members include an attachment portion to which a suspension hanger is attached to suspend the stack body. In this case, the suspension hanger is attached, through the attachment portion, to a rigid member (e.g., an end plate, a tension plate or a fastening member, such as a fastening bolt) that can bear transportation of the heavy fuel cell stack.

According to the present invention, the suspension hanger is selectively attached, for example, to a very rigid stack structure member, and can be employed directly to transport the fuel cell stack. After the transportation of the fuel cell stack has ended, the suspension hanger may either be removed from the stack structure member, or be retained as fixed.

A fuel cell stack, according to the present invention, has a stack body including a pile of fuel cells as a part of stack structural members, wherein the suspension hanger may be secured to any of the stack structural members.

A fuel cell stack, according to the present invention, has a stack body including a pile of fuel cells and fastening members for fastening the pile of fuel cells in a cell lamination direction, wherein the fastening members may include attachment portions to which suspension hangers are attached.

Since the fastening members are used to fasten the pile of fuel cells and are constituted so that they have a predetermined strength, and the rigidity is higher than that of the other stack structural members. Therefore, according to the present invention, suspension hangers are attached to rigid fastening members, and easy transportation of the fuel cell stack is directly enabled by using the suspension hangers. After the transportation of the fuel cell stack has ended, the suspension hangers may either be removed from the fastening members or be retained as fixed.

A fuel cell stack, according to the present invention, has a stack body including pile of fuel cells and fastening members for fastening the pile of fuel cells in a cell lamination direction, wherein the suspension hangers may be secured to the fastening members.

End plates that serve as parts of the fastening members may be located at both ends of the stack body in the cell lamination direction, and the suspension hangers may be provided for the end plates. That is, the fuel cell stack of the present invention may include a stack body, for which end plates are arranged at both ends in the cell lamination direction; and the suspension hangers, arranged at the end plates.

According to the present invention, the suspension hangers are arranged on rigid end plates. Thus, the fuel cell stack can be directly transported using the suspension hangers.

It should be noted that the stack structural members to which the suspension hangers are secured are not limited to the end plates. For example, fastening members (e.g., tension plates or fastening bolts) may be employed that couple one pair of end plates for sandwiching laminated cell members, and that exert a fastening force on the laminated cell members through these end plates.

The suspension hangers may be insulated from the stack body. Here, "insulated from the stack body" includes, for example, not only insulation between the suspension hangers and the end plates (the stack structure members or the fastening members) but also, in a case wherein, for example, the suspension hangers are secured to the end plates (the stack structure members or the fastening members) using bolts or the like, insulation between the suspension hangers and the end plates (the stack structure members or the fastening members) by these bolts, etc.

According to the present invention, conduction outside the fuel cell stack through the suspension hangers is prevented.

In case for accommodating the stack body is further included, the suspension hangers may be projected outside the case.

According to the present invention, in the state wherein the stack body is accommodated within a case, using the suspension hangers, the stack body can be transported with the case. Therefore, the strength of the case need not be increased, merely for the transportation of the fuel cell stack.

The suspension hangers may include hooked portions, which are to be put on suspension means, and pairs of the suspension hangers may be secured at a plurality of locations on the stack body. Also in this case, the hooked portions of the suspension hangers may each be secured facing in opposite directions.

According to this invention, when, for example, the fuel cell stack shakes while the fuel cell stack is being transported by putting the hooked portions of the suspension hangers on suspension means, such as a rope, wire or a chain, it is still difficult for the suspension means to be removed from the hooked portions.

A fuel cell stack installation structure according to the present invention, a fuel cell stack having one of the above described structures, is installed and secured in place using the suspension hangers.

According to the present invention, the suspension hangers used for transportation are also employed as fixing tools for securing a fuel cell stack in an installation destination (e.g., a vehicle, etc.).

A fuel cell stack transportation method, according to the present invention, for transporting a fuel cell stack having one of the above described structures, wherein the fuel cell stack is transported by being suspended using the suspension hangers.

According to the present invention, since transportation of the fuel cell stack is enabled using the suspension hangers, preparation of an additional operating tool or the like is not required.

According to the present invention, a method for mounting a fuel cell stack in a vehicle comprising mounting the fuel cell stack by being suspended using the suspension hangers.

In this case, after the mounting in the vehicle has been completed, the suspension hangers may be removed from the fuel cell stack, or may be retained, since they are secured to the fuel cell stack.

According to the present invention, since the mounting of a fuel cell stack in a vehicle is enabled using the suspension hangers, preparation of an additional operating tool or the like is not required.

BEST MODE FOR CARRYING OUT THE INVENTION

Figure 1:
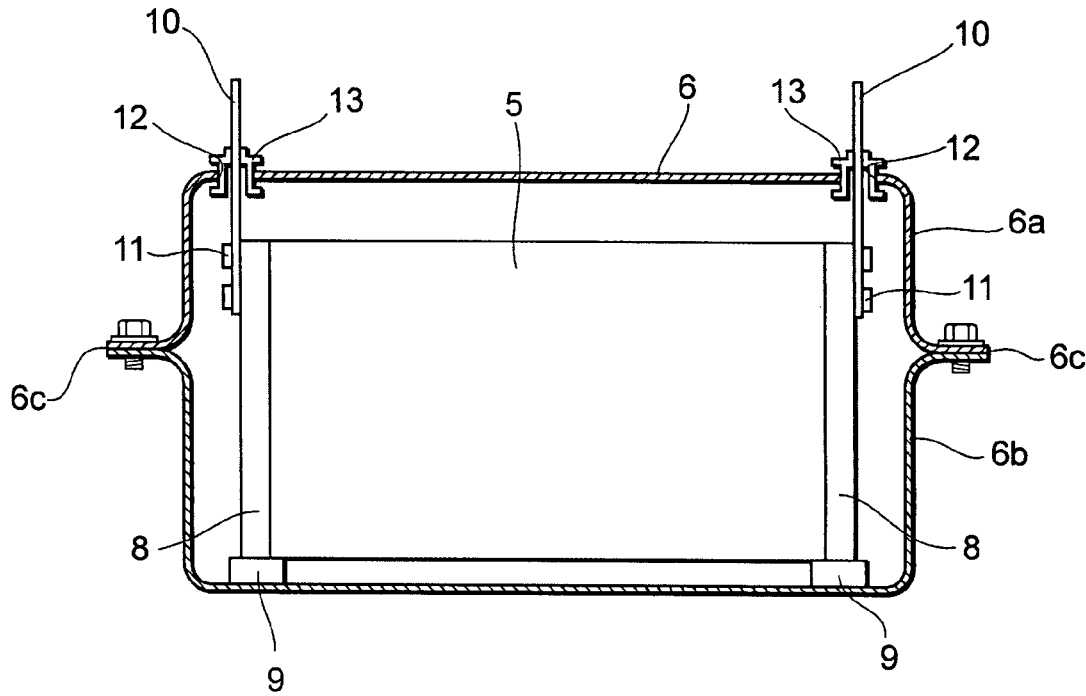
FIG. 1 is a side cross-sectional view of a fuel cell stack illustrated as one mode of the present invention.
Figure 2:
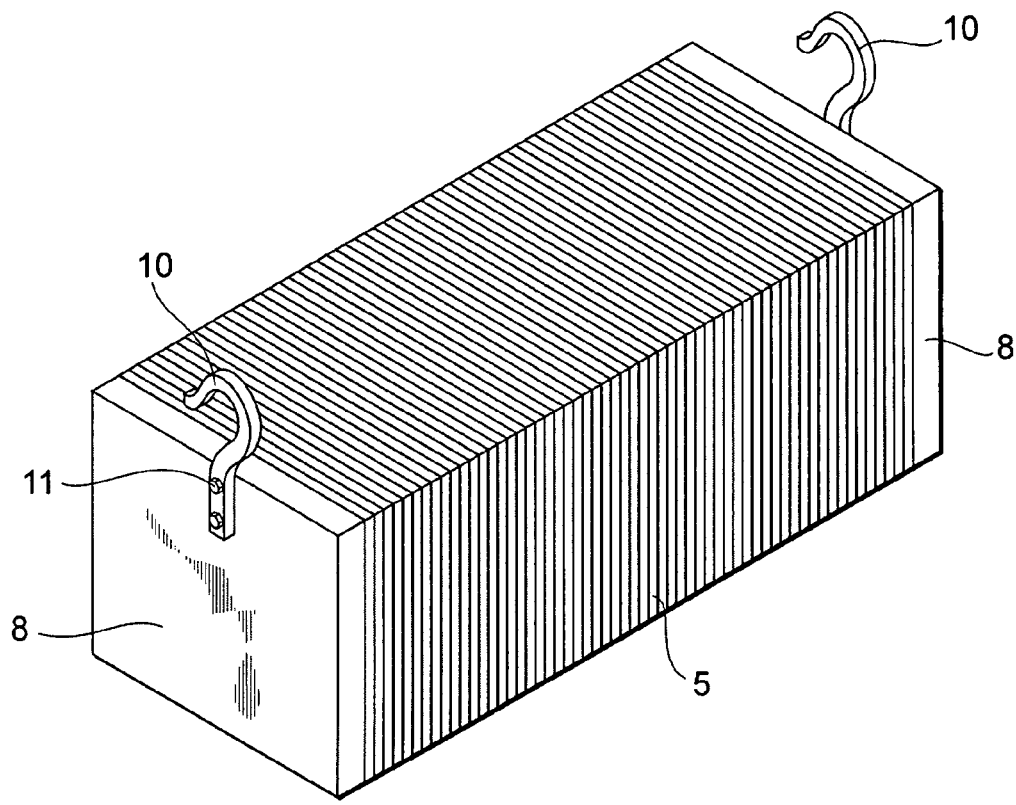
FIG. 2 is a perspective view of the fuel cell stack, the case being omitted.

One mode of the present invention will now be described while referring to drawings. FIG. 1 is a side cross-sectional view of a fuel cell stack, and FIG. 2 is a perspective view of the fuel cell stack, not shown is a case that will be described later. Further, FIG. 3 is a side cross-sectional view of the general structure of the fuel cell stack.

First, referring to FIG. 3, an explanation will be given for the general structure of the fuel cell stack that is also applied for the fuel cell stack of this mode. A fuel cell stack of a solid polymer electrolyte type used for a vehicle is employed for the following explanation, but the fuel cell stack is not limited to this example.

Figure 3:
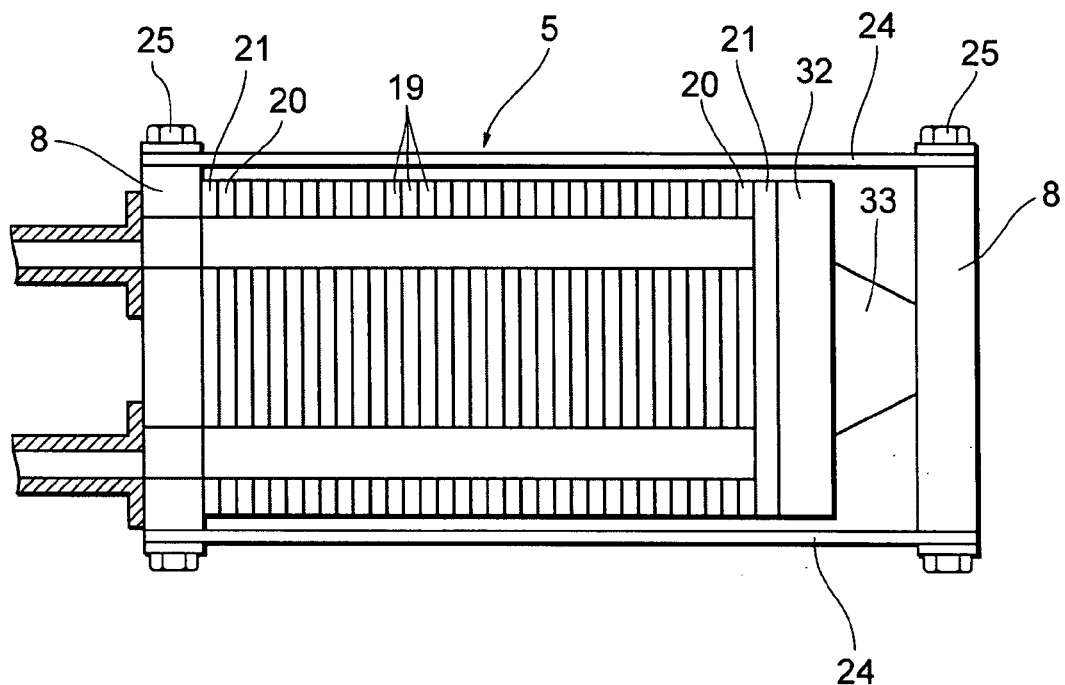
FIG. 3 is a schematic overview diagram of the general structure of the fuel cell stack.

A stack body 5 shown in FIG. 3 is constituted so that it includes a pile of fuel cells, which is formed by laminating a plurality of cells 19 each including a membrane-electrode assembly (MEA) and a separator.

The stack body 5 is constituted such that terminals (electrode plates) 20, insulators 21, end plates 8, 8 are arranged at both ends of the pile of fuel cells in a cell lamination direction, and fastening members 24 (e.g., tension plates or fastening bolts), which fasten the pile of fuel cells in the cell lamination direction and extend outside the pile of fuel cells in the cell lamination direction, are secured to the end plates 8, 8, using bolts 25.

On the side one end of the stack body 5, a pressure plate 32 is arranged between the end plates 8 and the insulator 21, and a spring mechanism 33, which is provided between the pressure plate 32 and the end plate 8, controls the change of a load imposed on the cells 19. It should be noted, however, that the spring mechanism 33 is not shown in FIG. 2 for the convenience sake of illustration.

A cell voltage is about one volt, and thus, in order to obtain a voltage of about 400 volts required for a vehicle, for example, about 200 cells 19 are laminated and electrically connected in series. To obtain the stack body 5, two piles of fuel cells are located in parallel and are electrically connected in series, and the parallel piles of fuel cells are sandwiched by the common end plates 8, 8.

As shown in FIG. 1, the fuel cell stack of this mode is provided by storing the stack body 5 in a case 6. The case 6 is in a state wherein an upper case 6a and a lower case 6b are assembled and secured at flange portions 6c, and the stack body 5 is secured to the case 6 through support portions 9.

As shown in FIGS. 1 and 2, metallic suspension hangers (hereinafter called simply hangers) 10 are secured to the end plates 8 using bolts 11. The hangers 10 project out from the case 6 through holes 12 that are formed in the upper case 6a, and gaps between the inner walls of the holes 12 and the hangers 10 are sealed by grommets 13 to ensure the water proofing and the dust proofing of the case 6.

Figure 4:
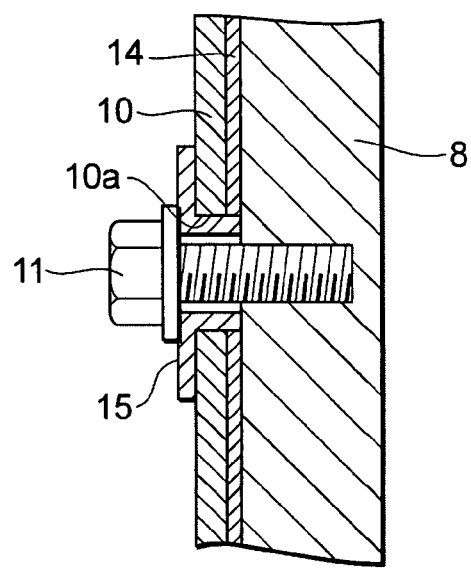
FIG. 4 is an enlarged cross-sectional view of a hanger attachment portion of the fuel cell stack.

FIG. 4 is an enlarged diagram for the attachment portion of the hanger 10. An insulating resin plate 14 is sandwiched between the hanger 10 and the end plate 8. Further, a hole 10a that the bolt 11 passes through is formed in the hanger 10, and an insulating resin collar 15 is fitted between the bolt 11 and the hanger 10. With this arrangement, the hanger 10 and the end plate 8 are insulated from each other.

Furthermore, as shown in this diagram, the bolt 11 is threaded so as to horizontally penetrate the hanger 10. Thus, when the fuel cell stack is suspended using the hangers 10, the weight of the fuel cell stack, which is affected by the force of gravity, can be appropriately supported by the bolts 11.

For transportation of the fuel cell stack, the stack body 5 is suspended using the hangers 10. At this time, the load of the stack body 5 is not imposed on the case 6. Further, since the end plates 8 have a satisfactory strength, a problem such as deformation does not occur when the load of the stack body 5 is imposed on the end plates 8. In order to obtain such a strength sufficient for transportation, the end plates 8 are made, for example, of stainless steel or the like.

As described above, according to this mode, the fuel cell stack can be easily transported without a special transportation tool being required.

In addition, since the suspension hangers 10 are not fitted to the case 6 for the fuel cell stack, but to the end plates 8 that have a satisfactory strength, the strength of the case 6 need not be increased more than necessary.

Further, at the place whereat the fuel cell stack is installed, the hangers 10 can be employed as fixing tools. For example, when the hangers 10 are used to engage with a frame of a vehicle and are fastened in place using bolts or the like, the fuel cell stack can be secured.

In a case wherein the hangers 10 need not be insulated from the end plates 8, the insulating resin plate 14 and the insulating resin collar 15 described above are not required. Furthermore, the insulation method is not limited to the above described example. For example, the hangers 10 may be formed of an insulating member, or an insulating layer may be deposited on the surfaces of the hangers 10.

The positions used for the securing of the hangers 10 need not be the end plates 8. The fuel cell stack includes, as stack structural members, the pile of fuel cells, the terminals 20, the insulators 21, the end plates 8, 8, the fastening members 24 and the like. So long as structural members have enough strength to bear the transportation of the fuel cell stack, the hangers 10 may be arranged on the stack structural members at locations other than the end plates 8, 8.

The securing method or attachment method for the hangers 20 is not limited to the above described example, and, for example, the hangers 20 may be fixed or bonded to stack structural members, such as the end plates 8, by welding or by using an adhesive material, etc.

Moreover, attachment portions (engaged portions), such as holes, may be formed in the stack structural members, such as the end plates 8, and the hangers may be suspended from the attachment portions.

Also, the hanger according to this invention needs not always be a S-shaped member. So long as the engaging of the structure is enabled by the engagement portions of a transportation (mounting) apparatus, any shape can be employed, and not only a member other than an S-shaped member, but also, for example, a hole can be employed.

Further, so long as the attachment portions of the present invention engage the engagement portions of a transporting (vehicle mounted) apparatus, any structure may be employed, and, for example, holes may be formed in the above described stack structural members.

Furthermore, the attachment portions of this invention may, for example, be rod-shaped attachment portions, such as holes, pressure holes or spiral holes, that are used to provide, for the stack structural members, such as the end plates, rod-shaped members (e.g., bolts) that pass through the hangers to couple the stack structure members with the hangers.

Further, when water proofing and dust proofing are not required, in accordance with a situation wherein the fuel cell stack has been installed, the grommets 13 may not be provided.

Figure 5:
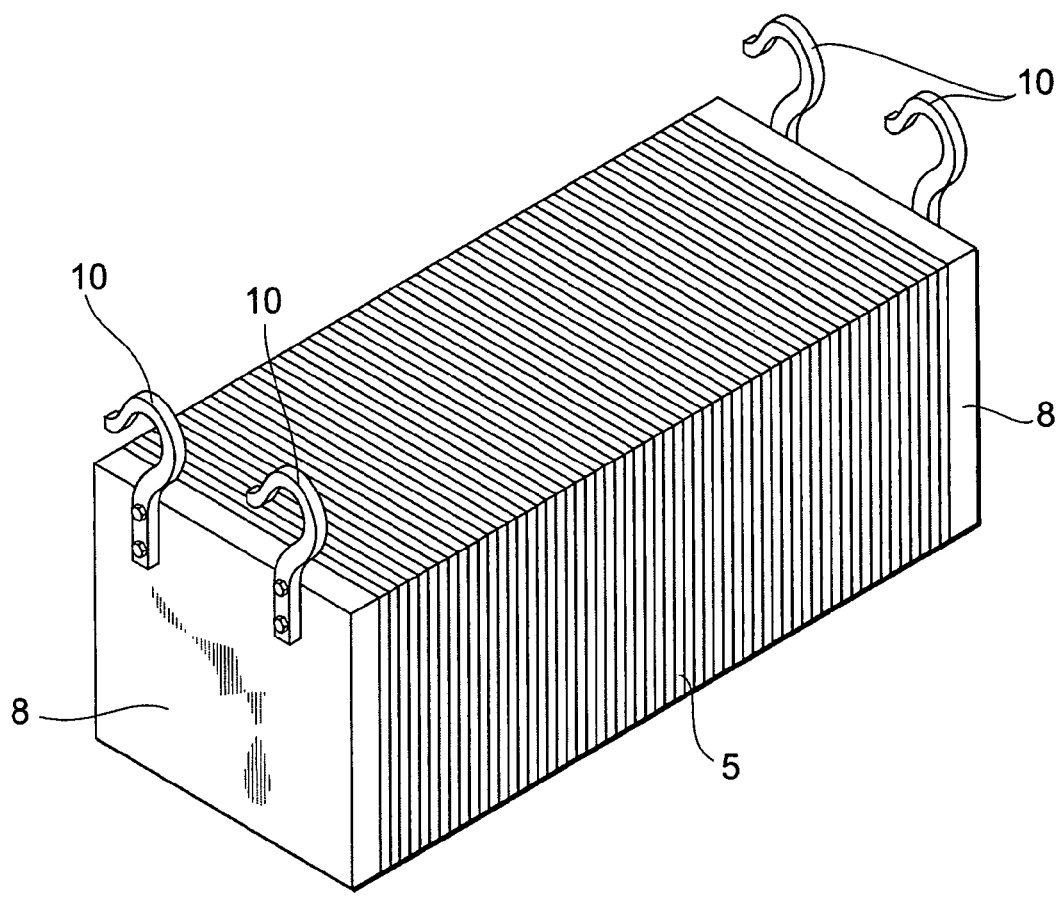
FIG. 5 is a perspective view of a first modification of a fuel cell stack.

In addition, as shown in the first modification in FIG. 5, a plurality of the hangers 10 may be provided on each of the sides of the stack body 5 in the lamination direction.

In this case, compared with the fuel cell stack wherein one hanger 10 is provided on each of the sides of the stack body 5 in the lamination direction, any pivoting motion that occurs during transportation can be suppressed.

Figure 6:
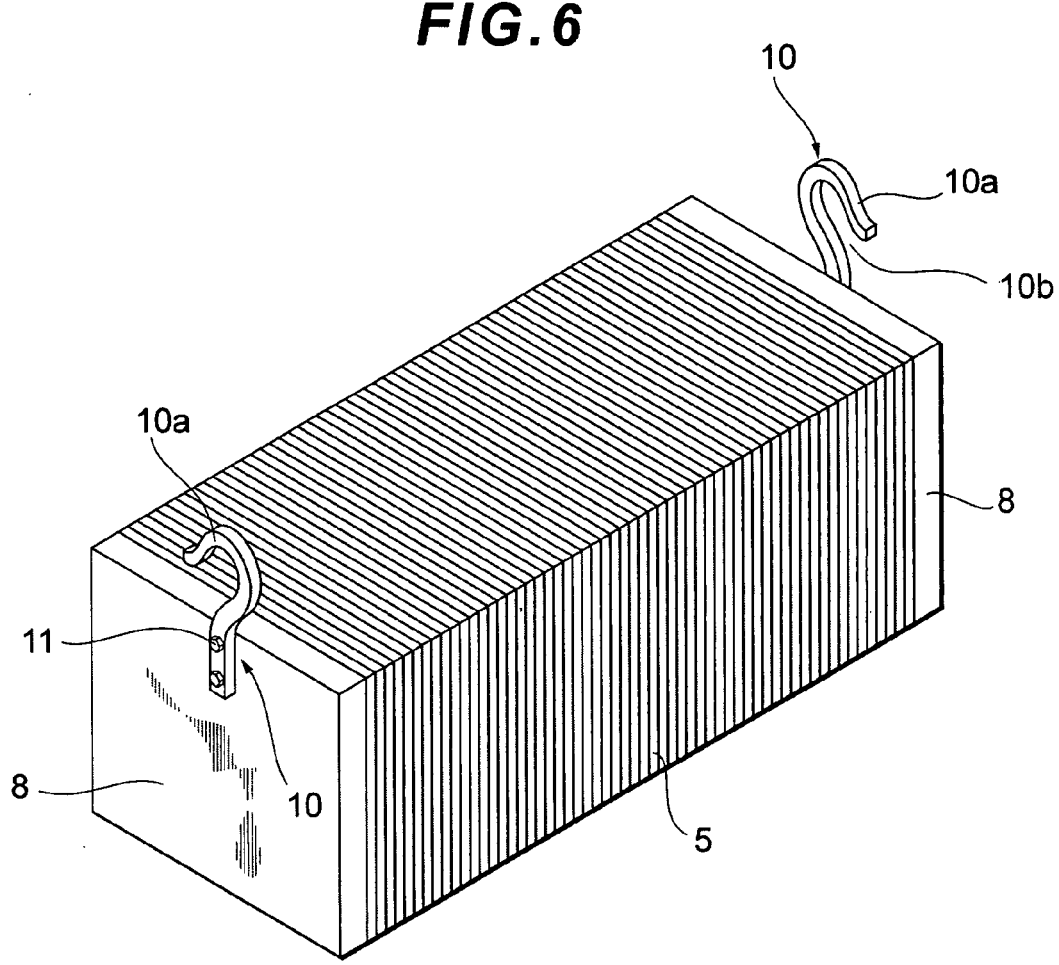
FIG. 6 is a perspective view of a second modification of a fuel cell stack.

FIG. 6 is a perspective view of a fuel cell stack according to the second modification.

As well as the hangers 10 according to the above mode and the modification (FIGS. 1, 2, 5, etc.), the hangers 10 according to this modification include hooked portions 10a that have notches 10b, through which the ends of suspension means (see reference numeral 120 in FIG. 13), such as ropes, wires, chains or the like are passed. And the hangers 10 are secured as a pair to either end (at a plurality of locations) of the stack body 5 in the cell lamination direction.

Further, in this modification, the pair of hangers 10 are so fitted that the hooked portions 10a face in opposite directions to each other along the planes of the end plates 8, 8, i.e., the notches 10b of the hangers 10 face in opposite directions to each other along planes perpendicular to the cell lamination direction.

With this arrangement, even if the fuel cell stack shakes while the fuel cell stack is being transported by putting the hooked portions 10a of the hangers 10 on the suspension means, the notches 10b of the hooked portions 10a are prevented from dropping off the suspension means.

Figure 7:
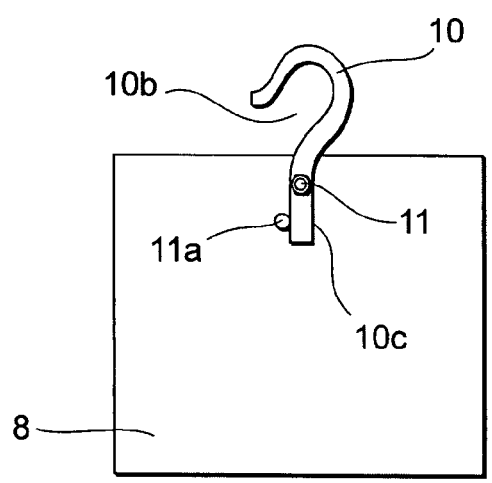
FIG. 7 is a perspective view of a third modification of a fuel cell stack.

FIG. 7 is a side view of a fuel cell stack according to the third modification.

As well as for the hangers 10 according to the above mode and the modifications (FIGS. 1, 2, 5, 6, etc.), for the hangers 10 according to this modification, portions 10c that are continuations of the hooked portions 10a and are used to fix the fuel cell stack are secured to the stack body 5 (the end plates 8, 8 in this modification) using the bolts 11.

In the mode and the modifications described above, two bolts 11 have been employed for one hanger 10 to secure the hangers 10 to the stack body 10 and to prevent the pivoting of the hangers 10 and the stack body, relative to each other. However, in this modification, only one bolt 11 is employed for each hanger 10 to secure the hangers 10 to the stack body 5, and projections 11a, which are formed on the end plates 8, 8 and project outward past the secured portions 10a in the direction of the thickness, are employed to prevent the pivoting of the stack body 5 and the hangers 10, relative to each other.

The projections 11a in this modification are formed at positions on the external surfaces of the end plates 8, 8 in the cell lamination direction, so that the notches 10b face upward from the bolts 11, i.e., referring to FIG. 7, so that the clockwise rotation of the hangers 10 is prevented.

According to this arrangement, since only one bolt 11 is used to secure one hanger 10 to the stack body 5, the number of steps required to mount the fuel cell stack can be reduced. In this modification, only one bolt 11 has been used to secure each hanger 10 to the stack body 5. However, it is natural for two or more bolts 11 to be employed for securing a hanger 10.

Further, so long as the above described relative rotation is prevented, the structure is not limited to the structure used for this modification. Various rotation restraint structures can be employed, such as a structure according to which projections are formed on the fixed portions 10c of the hangers 10 and are fitted into holes formed in the end plates 8, 8.

Figure 8:
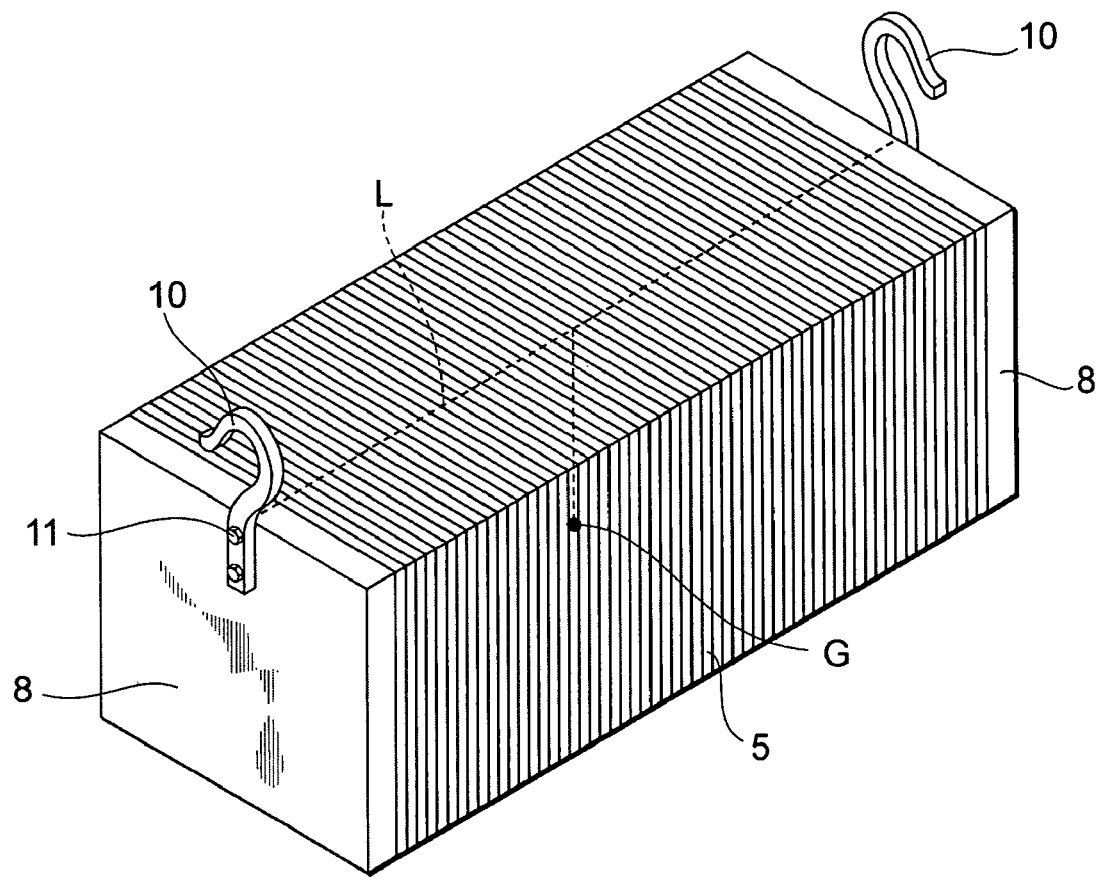
FIG. 8 is a perspective view of an example showing appropriate positions for suspension hangers secured to a fuel cell stack.

FIG. 8 is a perspective view of an example showing appropriate positions for the hangers 10 secured to the fuel cell stack.

In a case wherein, for example, a pair of hangers 10 are secured to the fuel cell stack in a predetermined direction and face each other, it is preferable that the securing positions be so designated that a line segment L, which connects hangers 10 that are opposite each other, runs near the center of gravity G of the fuel cell stack (more preferable, the center of gravity G is located on the line segment L). In this case, the shaking of the fuel cell stack that may occur during transportation can be suppressed.

In this diagram, an example is shown wherein a pair of the hangers 10 is secured so that the line segment L, which connects the hangers 10 located opposite each other in the cell lamination direction, is positioned above the center of gravity G of the fuel cell stack. With this arrangement, the shaking of the fuel cell stack that may occur during transportation can also be prevented.

Figure 9:
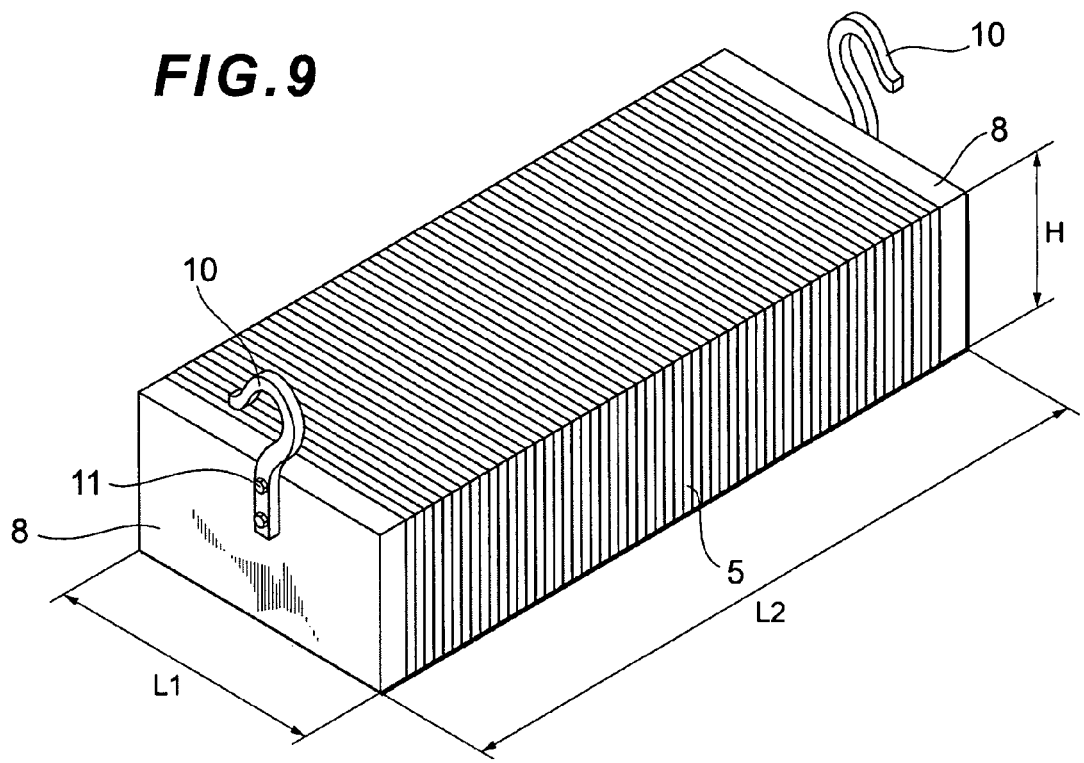
FIG. 9 is a perspective view of another example of appropriate positions for the suspension hangers secured to a fuel cell stack.

FIG. 9 is a perspective view of another example showing appropriate positions for the hangers 10 secured to a fuel cell stack.

Assume that the fuel cell stack has substantially a parallelepiped shape and three sides that form an outer contour of the fuel cell stack, and that among these three sides, H denotes a length of one side that is substantially aligned with the force of gravity during transportation of the fuel cell stack using the hangers 10, and L1 and L2 denote lengths of the two remaining sides. In this case, the positions of the hangers 10 secured to the fuel cell stack are so designated that at least one of the relationships L1>H and L2>H is established, or preferably both of the relationships are established.

Figure 10:
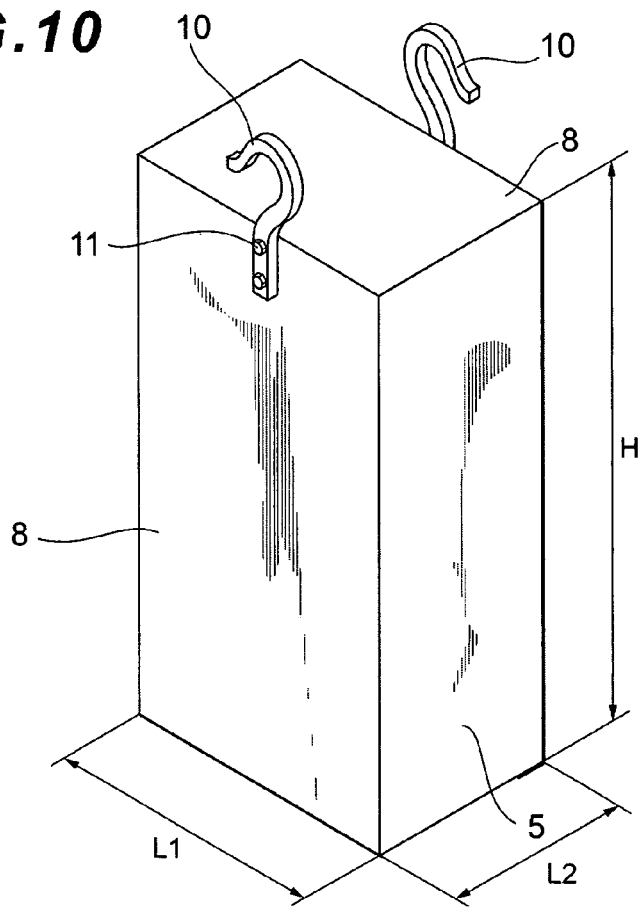
FIG. 10 is a perspective view of an additional example of appropriate positions for the suspension hangers secured to a fuel cell stack.

Specifically, the pivotal action that may occur during transportation of the fuel cell stack can be prevented in the case wherein the hangers 10 are secured at positions such as shown in FIG. 9, so that among the three sides of the fuel cell stack, the lengths of the two sides in the horizontal direction during transportation are longer than the length of the side H in the direction of height (toward the force of gravity), compared with a fuel cell stack wherein the hangers 10 are secured at positions such as shown in FIG. 10 for which the relationships L1<H and L2<H are established.

Figure 11:
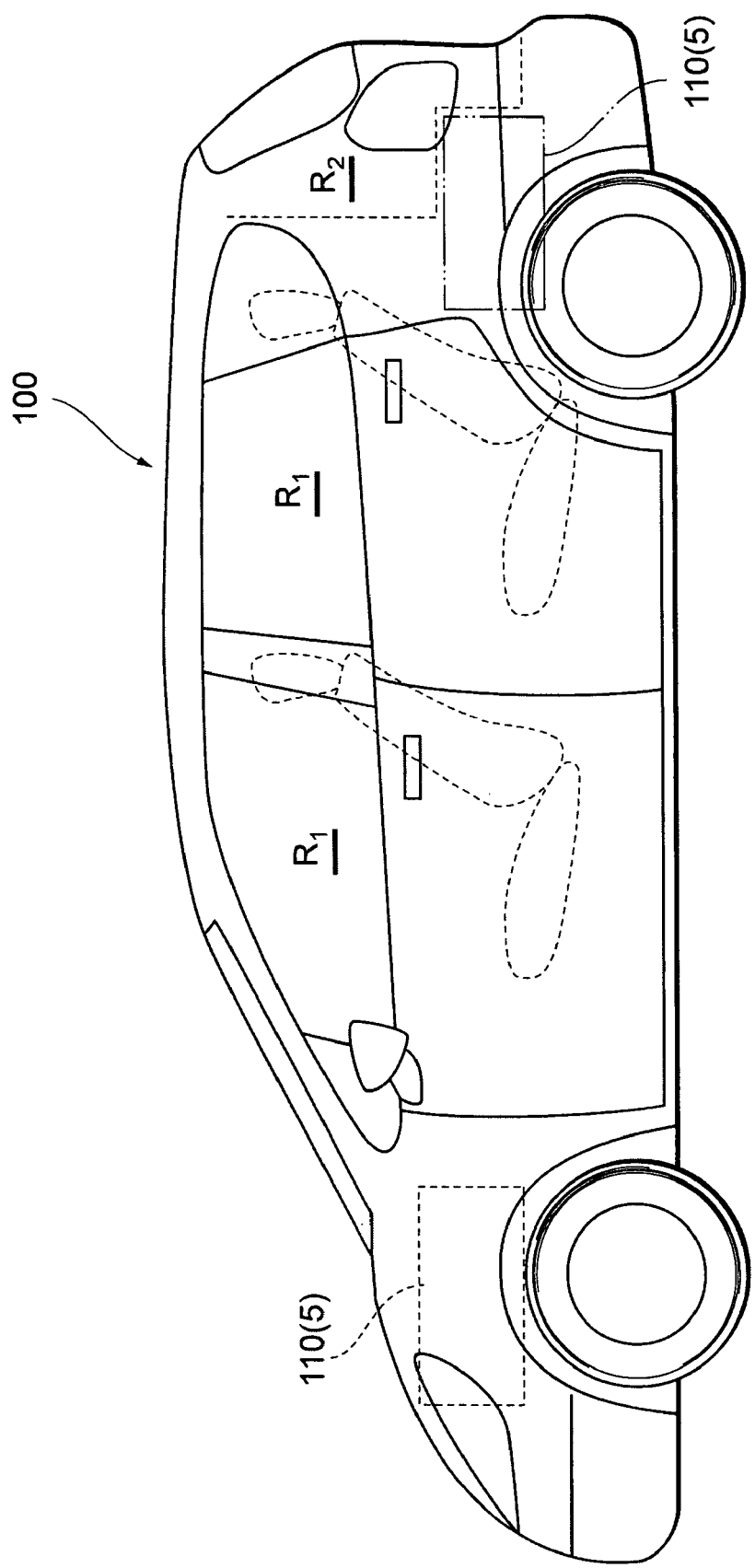
FIG. 11 is a side view illustrating an example wherein a fuel cell stack is mounted in a vehicle.

FIG. 11 is a side view illustrating an example wherein the fuel cell stack is mounted in a vehicle 100. As indicated by dotted lines in this diagram, a fuel cell stack 110, which includes a stack body 5, can be mounted in front of a driver/passenger compartment $R_1$, such as in an engine compartment 101, in the forward drive direction.

Figure 13:
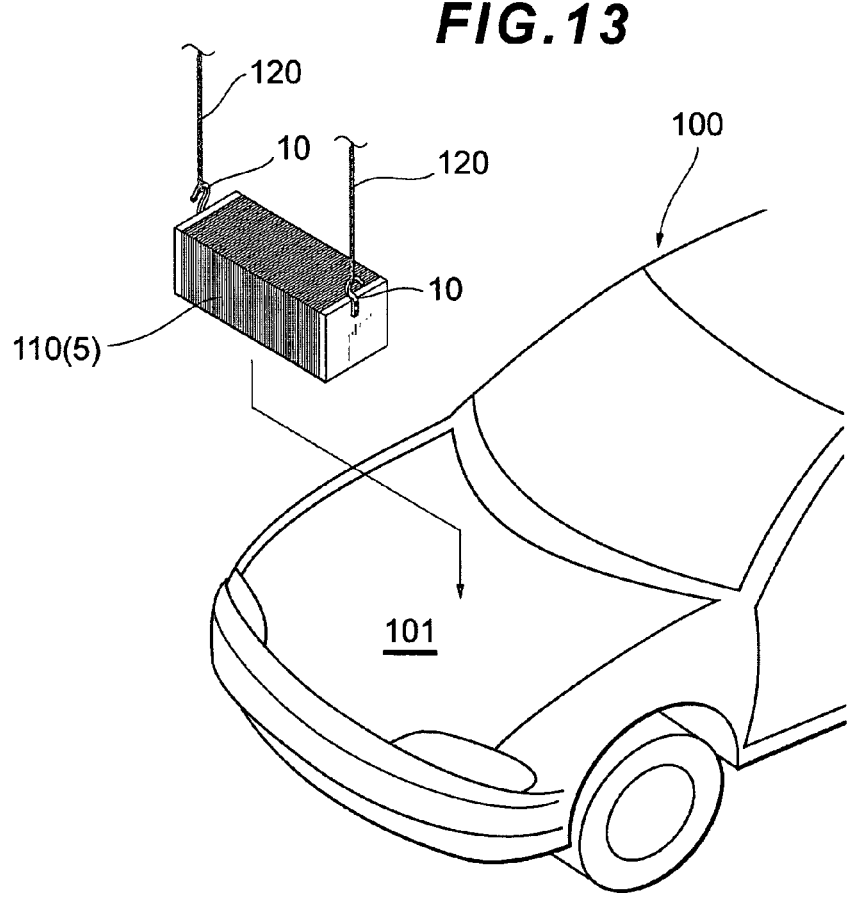
FIG. 13 is a is a perspective view illustrating an example wherein a fuel cell stack is transported to and mounted in a vehicle.
Figure 14:
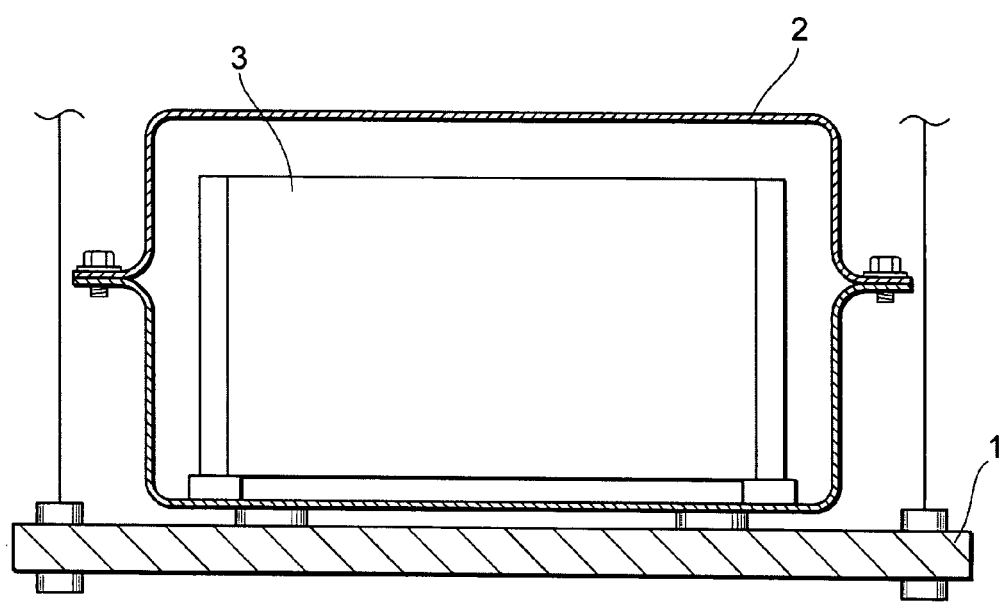
FIG. 14 is a side cross-sectional view illustrating a conventional method for transporting a fuel cell stack.

In this case, as shown, for example, in FIG. 13, the fuel cell stack 110 is transported while suspended by putting the hangers 10 on suspension means 120, such as chains or the like, and is positioned at a predetermined mounting location in the engine compartment 101.

Figure 12:
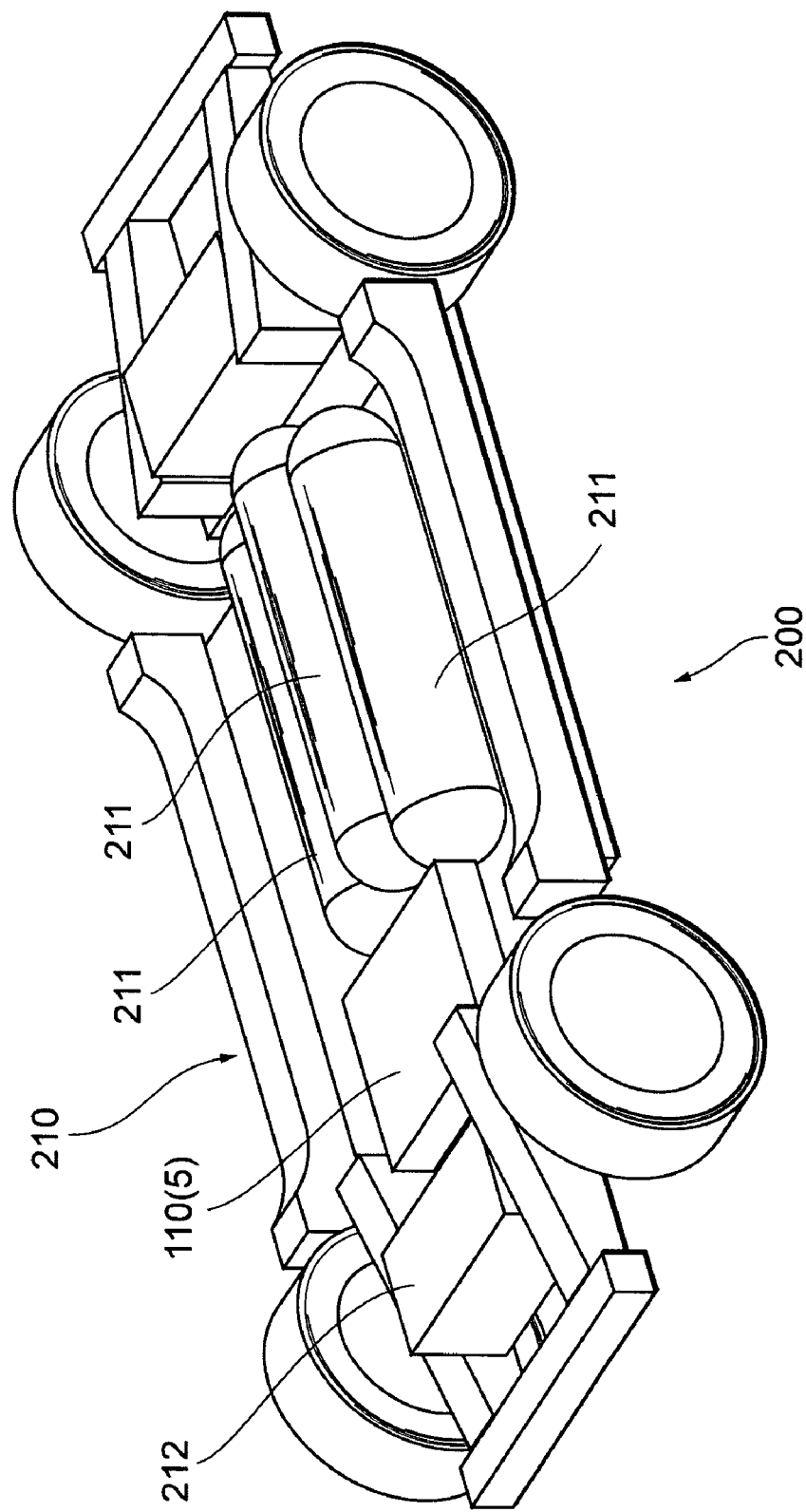
FIG. 12 is a perspective view illustrating an example wherein a fuel cell stack is mounted in a vehicle chassis.

It should be noted that the fuel cell stack 110 can also be mounted at the rear of the driver/passenger compartment $R_1$ in the forward drive direction, e.g., below a trunk compartment $R_2$, as indicated by dashed double-dotted lines in FIG. 11, or that the fuel cell stack 110 can be mounted in a chassis 210 having a skateboard shape, as shown in FIG. 12.

FIG. 12 is a perspective view illustrating an example wherein a fuel cell stack is mounted in a vehicular chassis.

In this diagram, a vehicle 200 that includes a chassis 210 is a fuel cell mounted vehicle that includes a so-called "drive by wire" system, whereby the steering and braking related to driving and all other vehicular functions are electronically controlled. It should be noted that in this diagram, body parts other than the chassis 210, including the interior and the like, are not shown, for convenience sake, for the explanation.

The chassis 210 of the vehicle 200 is formed in a skateboard shape. Not only the fuel cell stack 110, which includes the stack body 5, but also the basic structures required for driving, such as hydrogen storage tanks 211 and a drive motor 212, are concentrated in the chassis 210.

Since, in this manner, the vehicular driving functions are provided, for example, by using only the chassis 210, unlike the conventional vehicle 100 shown in FIG. 11, the position for the mounting of the fuel cell stack 110 in the vehicle 200 is not limited, in order to satisfy demands, for example, arising from the acquisition of the driver/passenger compartments $R_1$ and the trunk compartment $R_2$.

In a case wherein the fuel cell stack is to be mounted in the vehicle 100 or 200, it is preferable that, as shown in FIG. 13, the fuel cell stack be mounted so that the cell lamination direction corresponds to the horizontal direction. In this case, the cell lamination direction can be parallel, perpendicular or oblique to the forward drive direction.

It should be noted that regardless of whether or not the case 6 is included, the mode and the modifications described above can be applied for the fuel cell stack of the present invention, and in either case, the operating effects described above can be obtained.

INDUSTRIAL APPLICABILITY

According to the present invention, the fuel cell stack can be suspended and transported without any transportation tool or the like being employed. Further, since according to the structure suspension hangers are not arranged for a case wherein the fuel cell stack is stored, but for end plates that serve as stack structure members, the strength of the case need not be increased merely for transportation. Furthermore, the suspension hangers can be employed as tools for securing the fuel cell stack.

Therefore, the present invention can be widely employed for a fuel cell stack for which the above described requests are presented, and for the fuel cell stack installation structure, the fuel cell stack transportation method and the method for mounting the fuel cell stack in a vehicle.

The invention claimed is:

1. A fuel cell stack comprising:
   a stack body including a pile of fuel cells,
   wherein the stack body includes:
     a rigid member being capable of bearing transportation of the fuel cell stack; and
     an engagement portion for engaging with a transporting apparatus, the engagement portion being attached to the rigid member so that a cell lamination direction of the stack body is substantially a horizontal direction during the transportation;
   wherein the engagement portion is a suspension hanger for suspending the stack body,
   wherein the suspension hanger includes a hooked portion.
2. A fuel cell stack comprising:
   a stack body having a pile of fuel cells;
   wherein the stack body includes:

a rigid member being capable of bearing transportation of the fuel cell stack;
a suspension hanger for suspending the stack body, the suspension hanger provided with the rigid member to be capable of pivot; and
a rotation prevention structure for preventing the suspension hanger from pivoting relative to the rigid member during transportation,
wherein the rotation prevention structure is configured to prevent rotation of the suspension hanger in and of itself.

3. A fuel cell stack according to claim 2,
wherein the rotation prevention structure comprises a projection formed on the rigid member; and
wherein the projection prevents the suspension hanger from pivoting when brought into contact with the suspension hanger during transportation.

4. A fuel cell stack according to claim 1,
wherein the fuel cell stack has a parallelepiped shape and three sides in three dimensions that form an outer contour of the fuel cell stack, and at least one of relationships $L1>H$ and $L2>H$ is established, where among the three sides, H denotes a length of one side that is substantially aligned with the force of gravity during transportation and L1 and L2 denote lengths of the two remaining sides.

5. A fuel cell stack according to claim 1, wherein the stack body includes a bolt extending through the suspension hanger horizontally for securing the suspension hanger to the rigid member.

6. A fuel cell stack comprising:
a stack body having a pile of fuel cells,
wherein the stack body includes:
　rigid members arranged at both ends in a cell lamination direction and being capable of bearing transportation of the fuel cell stack; and
　engagement portions provided with the rigid members and electrically insulated from the rigid members, the engagement portion engaging with a transporting apparatus,
wherein the engagement portions are suspension hangers for suspending the stack body,
wherein the suspension hanger includes a hooked portion.

7. A fuel cell stack comprising:
a stack body having a pile of fuel cells, and
a case in which the stack body is stored;
wherein the stack body includes:
　a rigid member being capable of bearing transportation of the fuel cell stack;
wherein a suspension hanger for suspending the stack body is attached to the rigid member; and
wherein the suspension hanger includes a hooked portion that is projected outside the case.

8. A fuel cell stack comprising:
a stack body having a pile of fuel cells, and
a case in which the stack body is stored;
wherein the stack body includes:
　a rigid member being capable of bearing transportation of the fuel cell stack;
wherein suspension hangers for suspending the stack body are attached to the rigid members;
wherein the suspension hangers include hooked portions to be put on suspension means, and the suspension hangers are secured in pairs at a plurality of locations on the stack body; and
wherein the hooked portions of the suspension hangers of the pair face in opposite directions to each other.

9. A fuel cell stack installation structure wherein a fuel cell stack according to claim 1 is installed and secured in place using the engagement portion.

10. A method for transporting a fuel cell stack according to claim 1, wherein the fuel cell stack is transported by being suspended using the engagement portion.

11. A method for mounting, in a vehicle, a fuel cell stack according to claim 1, wherein the fuel cell stack is mounted in the vehicle by being suspended using the engagement portion.

12. A method for mounting a fuel cell stack in a vehicle, according to claim 11, wherein after the mounting in the vehicle has been completed, the engagement portion is removed from the fuel cell stack.

* * * * *